(12) United States Patent
Witte

(10) Patent No.: US 11,701,839 B2
(45) Date of Patent: Jul. 18, 2023

(54) METHOD AND SYSTEM FOR JOINING TWO COMPONENTS OF A MELTABLE MATERIAL

(71) Applicant: Airbus Operations GmbH, Hamburg (DE)

(72) Inventor: Tassilo Witte, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 906 days.

(21) Appl. No.: 16/439,167

(22) Filed: Jun. 12, 2019

(65) Prior Publication Data

US 2019/0381742 A1 Dec. 19, 2019

(30) Foreign Application Priority Data

Jun. 14, 2018 (DE) .......................... 102018114269.2

(51) Int. Cl.
*B29C 65/16* (2006.01)
*B23K 26/06* (2014.01)
(Continued)

(52) U.S. Cl.
CPC ...... *B29C 65/1645* (2013.01); *B23K 26/0604* (2013.01); *B23K 26/0643* (2013.01); *B23K 26/0652* (2013.01); *B23K 26/0676* (2013.01); *B23K 26/08* (2013.01); *B23K 26/244* (2015.10); *B23K 26/324* (2013.01);
(Continued)

(58) Field of Classification Search
CPC ............ B23K 26/0676; B23K 26/0652; B23K 26/0643; B23K 26/244; B29C 65/1645; B29C 66/1122
See application file for complete search history.

(56) References Cited

U.S. PATENT DOCUMENTS

| 2,084,625 A | * | 6/1937 | Stebbins | ............. B29C 65/1432 |
| | | | | 156/499 |
| 3,166,458 A | * | 1/1965 | Chinn | ................. B29C 66/8223 |
| | | | | 47/9 |

(Continued)

FOREIGN PATENT DOCUMENTS

DE 102006058997 A1 * 6/2008 ........... B23K 26/082

OTHER PUBLICATIONS

Machine Translation of DE-102006058997-A1 (Year: 2008).*

*Primary Examiner* — Daniel McNally
(74) *Attorney, Agent, or Firm* — Greer, Burns & Crain, Ltd.

(57) ABSTRACT

A method for joining two components of a meltable material comprises the steps of providing a first component having a first border region and a second component having a second border region, placing the second component relative to the first component so as to form an overlap between the first border region and the second border region under a gap between the first border region and the second border region, continuously heating opposed sections of the first border region and the second border region at the same time through at least one energy source arranged in the gap at least partially, continuously providing a relative motion of the at least one energy source along the first border region and the second border region in the gap, and continuously pressing already heated sections of the first border region and the second border region onto each other.

9 Claims, 2 Drawing Sheets

(51) Int. Cl.
    *B23K 26/067*     (2006.01)
    *B23K 26/08*     (2014.01)
    *B23K 26/244*     (2014.01)
    *B23K 26/324*     (2014.01)
    *B29C 65/00*     (2006.01)
    *B29C 65/78*     (2006.01)
    *B23K 26/70*     (2014.01)
    B29L 31/30     (2006.01)
    B23K 101/00     (2006.01)
    B23K 103/00     (2006.01)
    B29K 701/12     (2006.01)

(52) U.S. Cl.
    CPC ........ *B23K 26/702* (2015.10); *B29C 65/7802* (2013.01); *B29C 66/1122* (2013.01); *B23K 2101/006* (2018.08); *B23K 2103/42* (2018.08); *B29K 2701/12* (2013.01); *B29L 2031/3005* (2013.01)

(56) References Cited

U.S. PATENT DOCUMENTS

| | | | | |
|---|---|---|---|---|
| 4,061,519 | A * | 12/1977 | Hammer | B29C 66/91431 156/324 |
| 6,411,759 | B1 * | 6/2002 | Beguin | G02B 6/30 385/96 |
| 2003/0116545 | A1 * | 6/2003 | Kaji | B23K 26/067 219/121.72 |

* cited by examiner

METHOD AND SYSTEM FOR JOINING TWO COMPONENTS OF A MELTABLE MATERIAL

CROSS-REFERENCES TO RELATED APPLICATIONS

This application claims the benefit of the German patent application No. 102018114269.2 filed on Jun. 14, 2018, the entire disclosures of which are incorporated herein by way of reference.

FIELD OF THE INVENTION

The invention relates to a method for joining two components of a meltable material. The invention further relates to a system of joining two components of a meltable material.

BACKGROUND OF THE INVENTION

Large passenger transportation means, such as commercial aircraft, usually comprise a primary structure surrounded by large sheet-like skin panels. It is a common approach to drive rivets through the skin panels, which require the drilling of holes, processing the surface of an edge that surrounds the respective holes and the edges of the holes, fastening the rivets and finishing the surface. Also, cohesive joints, which are based on gluing edge regions onto each other is possible, but rarely used, especially not in load carrying areas. With metallic and nonmetallic materials also further joining methods are in research, which also include induction welding, friction welding, infrared-light welding, resistance welding and other.

SUMMARY OF THE INVENTION

It is an object of the invention to propose a method or a system for joining two components of a meltable material, especially a fiber reinforced plastic material, without any auxiliary materials left in a joint area and evenly distributed melting zone in the joint area.

A method for joining two components of a meltable material is proposed, the method comprising the steps of providing a first component having a first border region and a second component having a second border region, placing the second component relative to the first component so as to form an overlap between the first border region and the second border region under a gap between the first border region and the second border region, continuously heating opposed sections of the first border region and the second border region at the same time through at least one energy source arranged in the gap at least partially, continuously providing a relative motion of the at least one energy source along the first and second border region in the gap, and continuously pressing already heated sections of the first border region and the second border region onto each other.

The meltable material may include a metallic material or a plastic material. For future aircraft applications it may be feasible to use a thermoplastic material for a fuselage skin. Such a material may also be fiber reinforced, for example by carbon fibers.

The first component and the second component both comprise a border region, which is to be understood as a part of the respective component that includes a border. The border region may be of a stripe shape and extends along the border. The border region does not necessarily have a constant width, but it is preferred that the first border region and the second border region have the same geometrical shape to allow both border regions to be joined together.

The second component and the first component are placed so as to form an overlap between both border regions under a gap. This means that both border regions are arranged congruent to each other and merely enclose the gap. In doing so, the gap is given by a displacement of both border regions in a direction vertical to the border regions.

For joining both components, opposed sections of the first border region and the second border region are heated through the at least one energy source, which is moved along the border regions. The already heated sections are then pressed onto each other. By heating the opposed sections of the first border region and the second border region, the material of the border regions is melted. In this state, it is possible to press the melted sections onto each other, in order to provide a material joint. When pressing both already heated sections onto each other, the gap is eliminated here.

It is intended to conduct the method according to the invention as a continuous method. Hence, when both border regions are placed under a gap, the at least one energy source may be moved along the gap between both border regions and the molten material is continuously pressed directly afterwards. The gap is continuously eliminated and both border regions are continuously joined.

By this method also very large sheet-like components may be joined in a continuous process without requiring any auxiliary materials left in the area between both border regions and an evenly distributed melting zone. These sheet-like components may be realized in the form of skin panels of an aircraft fuselage. Hence, an aircraft fuselage section may be manufactured by overlapping and joining curved skin panels.

In a preferred embodiment, the heating comprises applying a first laser beam on a first section of the first border region and a second laser beam on a second section of the second border region, wherein the first section and the second section are directly opposed. Hence, the at least one energy source may comprise a single laser device or two independent laser devices capable of emitting a first laser beam and a second laser beam to heat opposed sections of the opposed border regions. Hence, the method comprises a modified laser beam welding for heating both joining partners separately and directly on the border region that will be pressed onto the other border region. The laser beams provide a concentrated energy source and allow quick heating and also high cooling rates. The shape of the laser beams, as well as the location of the focal point, can be adjusted to match the border region for providing a uniform and homogenous molten section on the respective border region. The laser may be realized as a continuous or pulsed laser depending on the material of the components as well as the thickness of the border regions. It may be advantageous to use a gas laser, such as a $CO_2$ laser, which provides a high power capability.

In an advantageous embodiment, the at least one energy source comprises a first laser for emitting the first laser beam, a second laser for emitting the second laser beam and at least one deflecting device, which is arranged in the gap, wherein the at least one deflecting device directs the first laser beam onto the first border region and the second laser beam onto the second border region. The deflecting device may comprise a first mirror and a second mirror to simply reflect the first laser beam and the second laser beam into the desired direction. This may increase the available power for melting the material of the first and second components, which may lead to an increased speed of the welding process. In this regard, both mirrors may be swiveled to effectively broaden the first and second laser beams by widening the area onto which the laser beams impinge. Both laser beams therefore sweep over a line, wherein the material along the line is heated up. When the relative motion is conducted, also the laser lines move along the border regions, leading to heat a stripe shaped region having a width given by the sweep angle.

Advantageously, the at least one energy source comprises a single laser and a laser splitter, wherein the heating comprises emitting a main laser beam onto the laser splitter placed inside the gap and separating the main laser beam into the first laser beam and the second laser beam. In doing so, a single laser can be used for producing two separate laser beams having different spatial orientations. Two separate laser beam sources are not required and the complexity of the energy source can be reduced and the spatial relation between both laser beams is fixed and given by the laser splitter. The laser splitter is to be understood to be a device that is able to receive a single laser beam and to emit two separate laser beams that are generated by splitting the received laser beam. The setup of the laser splitter may be chosen from different options.

For example, the laser splitter may comprise a prism arrangement. The prism arrangement may exemplarily comprise two triangular prisms, which are glued together at their base. Depending on the prism material and the setup of the bases that are glued together, half of the received beam is reflected to form the first beam and another half of the received beam is transmitted to another face of the assembly and exits the face to form the second beam. The prism arrangement may be adapted to be swiveled around a certain swivel axis, which leads to a swiveling of the first laser beam and the second laser beam accordingly. By periodically swiveling the prism arrangement, the first and second laser beams sweep over a certain line on the respective border region, such that the first and second laser beams are effectively spread and such that the border regions are each exposed to a broader laser beam. Instead of swiveling the prism arrangement, also additional deflecting mirrors may be arranged between the prism arrangement and the respective border region, wherein the deflecting mirrors are adapted to be swiveled around a certain swivel axis to periodically deflect the respective laser beam.

As another example, the beam splitter comprises a partially reflecting mirror. The mirror reflects a part of the received laser beam at a certain angle to form the first beam and the remaining part is transmitted through the mirror to form the second beam. The mirror may be adapted to be swiveled around a certain swivel axis as well, which leads to a swiveling of the first laser beam and the second laser beam accordingly. The border regions are resultantly each exposed to a broader laser beam. Also, the mirror may be realized as a curved mirror, which broadens the respective laser beams by itself.

A still further option is to use a wedge shaped mirror, which comprises two wedge surfaces at an angle to each other and wherein the main laser beam is directed onto a common edge of the mirror. Hence, a first half of the beam is reflected from one of the wedge surfaces to form the first laser beam. A second half of the beam is reflected from the other one of the wedge surfaces to form the second laser beam. The applicability of this option, however, depends on the shape of the laser beam. Such a design of the beam splitter is very robust and efficient. Again, the wedge shaped mirror may be swiveled to effectively broaden the respective laser beams.

In an advantageous embodiment, the method further comprises guiding the first and second components on a pair of distanced separating guides. The separating guides should be capable of guiding at least both border regions in a predetermined distance. This allows to place the at least one energy source between the border regions, i.e., in the gap. The separating guides may be realized in the form of rods, rollers, surface-like elements, guide blocks and other. If the separating guides are realized in the form of separating rollers, these may be understood as cylindrical or conical bodies that are rotatably supported on an axle each. It may be feasible to drive one or both separating rollers to provide a conveying force onto the border regions, which leads to supporting the relative motion of the at least one energy source along the border regions. However, the separating rollers may also be completely passive.

Advantageously, the step of pressing already heated sections of the first border region and the second border region onto each other comprises pressing two opposed pressure rollers onto both the first border region and the second border region from a side facing away from the gap. Hence, both the first component and the second component are clamped together by two pressure rollers, which exert a certain force onto both border regions. This leads to pressing the molten parts of the components together, which creates a material engagement between both border regions. It may be feasible to provide a predetermined force onto the pressure rollers in order to control the joining process and thus the joint quality.

As outlined above the method according to the invention is suitable and advantageous for joining large to very large components. Thus, it is advantageous if the first component and the second component each are a skin panel of a vehicle. The vehicle may, for example, be an aircraft, a spacecraft, a ship, a boat, a train or a ground-based vehicle.

It is advantageous if the material is a thermoplastic material. This may include PA (Polyamide), PPS (polyphenylene sulfide), PEI (polyetherimide), PEEK (Polyetheretherketone), PEKK (Polyetherketoneketone) or other materials. A fuselage skin may be sufficiently rigid with a skin thickness of a few millimeters to, exemplarily, 10 to 15 mm.

The invention furthermore relates to a system for joining two components of a meltable material, the system comprising at least one energy source, a pair of separating guides, and a pair of pressure rollers, wherein the system is adapted for placing the second component relative to the first component on opposed sides of the separating guides so as to form an overlap between a first border region of the first component and a second border region of the second component under a gap between the first border region and the second border region, for heating the first border region and the second border region through the at least one energy source placed in the gap at least partially, for relatively moving the at least one energy source along the first border region and the second border region in the gap, and for pressing already heated sections of the first border region and the second border region onto each other by the pressure rollers.

The at least one energy source may advantageously comprise a first laser for emitting the first laser beam, a second laser for emitting the second laser beam and at least one deflecting device, which is arranged in the gap, wherein the at least one deflecting device is adapted for directing the first laser beam onto the first border region and the second laser beam onto the second border region. As stated further above, this may increase the welding power and the welding speed.

As stated above, the at least one energy source may comprise a single laser and a laser splitter, wherein the laser splitter is adapted for separating a main laser beam emitted by the laser into a first laser beam and a second laser beam for heating the first border region and the second border region.

Again, the laser splitter may comprise a prism arrangement. As an alternative, the laser splitter may also comprise a partially reflecting mirror. As another alternative, the laser splitter may comprise a wedge shaped mirror, which comprises two wedge surfaces at an angle to each other and wherein the laser beam is directed onto a common edge of the mirror.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION OF EXEMPLARY EMBODIMENTS

Figure 1:
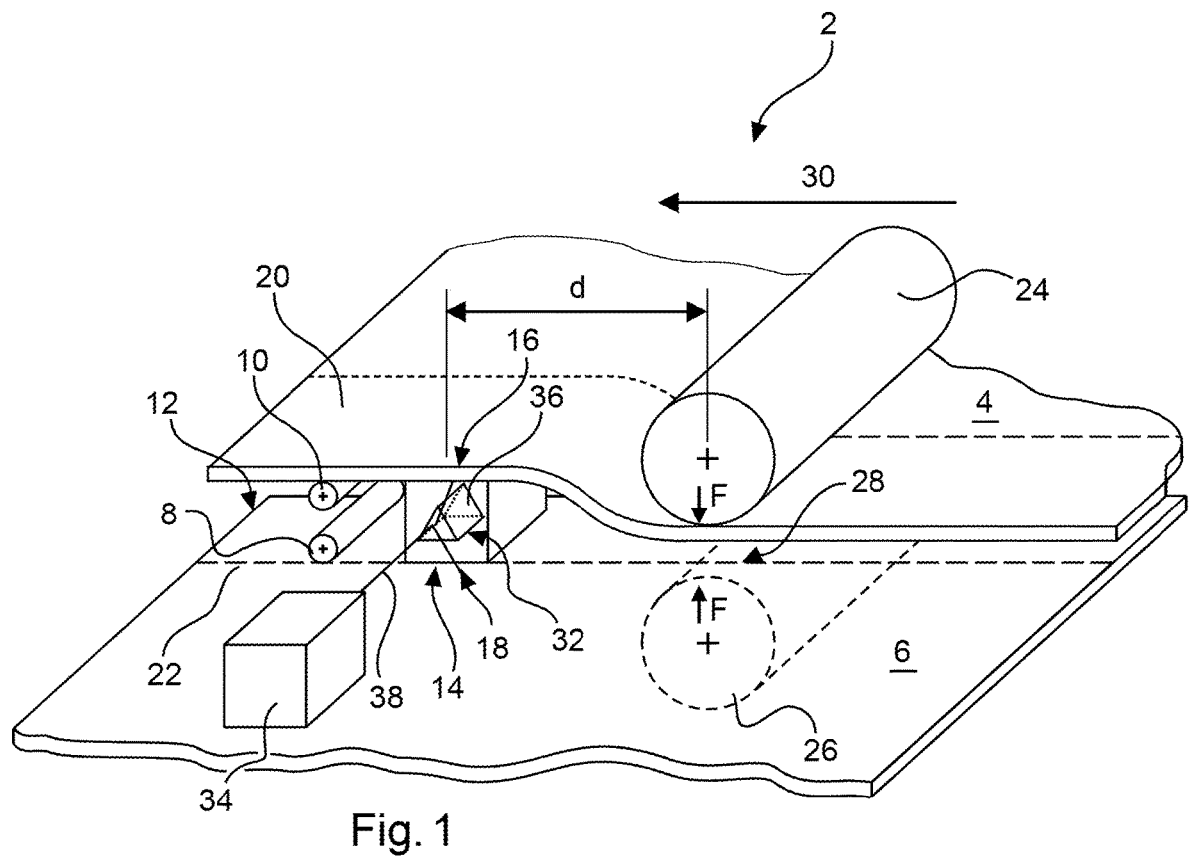
FIG. 1 shows a system for joining two components of a meltable material in a schematic view.

FIG. 1 shows a system 2 for joining two components 4 and 6 of a meltable material. The system 2 comprises a pair of separating guides in the form of separating rollers 8 and 10, which are arranged in a distance to each other and which are rotatably supported. They serve for guiding the first component 4 and the second component 6 in a predetermined distance to each other for producing a gap 12.

A laser splitter 14 as a part of an energy source is arranged in the gap 12 and is adapted for receiving a laser beam, exemplarily from a single laser 34, and for transmitting a first laser beam 16 and a second laser beam 18 into opposed directions. The first laser beam 16 is directed to the first component 4, while the second laser beam 18 is directed to the second component 6. They are used for heating a section of a first border region 20 of the first component 4 and a second border region 22 of the second component 6. A main laser beam 38 emitted from the laser 34 is adjusted to comprise sufficient power to melt the material that is exposed to the first and second laser beams 16 and 18, at least partially. To maintain a small distance between the laser 34 and the laser splitter 14 independent of the dimensions of the first component 4 and the second component 6. it is placed laterally to the laser splitter 14.

The system 2 further comprises a pair of pressure rollers 24 and 26, which are arranged at a distance to each other on sides of the components 4 and 6 that face away from the respective other component 6 or 4. The pressure rollers provide a constriction 28, through which the first component 4 and the second component 6 extend. The distance between the pressure rollers 24 and 26 is less than the distance between the separating rollers 8 and 10. If the heated and partially molten border regions 20 and 22 are moving relative to the pressure rollers 24 and 26, the molten material of the first border region 20 and the second border region 22 are pressed together and thus generate a material engagement.

In FIG. 1 only a part of the first component 4 and the second component 6 is shown. It is apparent that the components 4 and 6 may comprise much larger dimensions. In order to provide an overlapping joint of the first component 4 and the second component 6 the separating rollers 8 and 10, the laser splitter 14 and the pressure rollers 24 and 26 may comprise the fixed spatial relationship and are movable along a welding direction 30 indicated by an arrow. For example, the rollers 8, 10, 24 and 26, as well as the laser splitter 14, are arranged on a common frame, which is moved along the welding direction 30.

Hence, the first border region 20 and the second border region 22 are continuously heated from inside the gap 12, which is created or maintained by the separating rollers 8 and 10. When moving along the first border region 20 and the second border region 22, already molten material is pressed onto each other through the pressure rollers 24 and 26. After cooling off, both components 4 and 6 are welded together.

The laser 34 is exemplarily arranged outside the gap 12 and emits a main laser beam 38 onto a face 32 of the laser splitter 14. The laser splitter 14 may comprise a prism arrangement 36, which may include two prisms glued to each other for allowing the main laser beam 38 entering the prism arrangement 36 to be split into the first laser beam 16 and the second laser beam 18. By swiveling the prism arrangement 36, or the laser splitter 14, respectively, the laser beams 16 and 18 sweep from one lateral side of the respective border region to the other lateral side, thereby heating up the whole respective border region when the relative motion between the components 4 and 6 and the laser splitter 14 is conducted.

A distance d between the laser splitter 14 and the center of the pressure rollers 24 and 26 should be minimized, in order to minimize the time that passes between heating up the respective section of the first border region 20 and the second border region 22 and pressing the border regions 20 and 22 together. This may be achieved by minimizing the dimensions of the laser splitter 14 as much as possible, which allows a smaller gap 12 and thus a shorter distance d.

Figure 2:
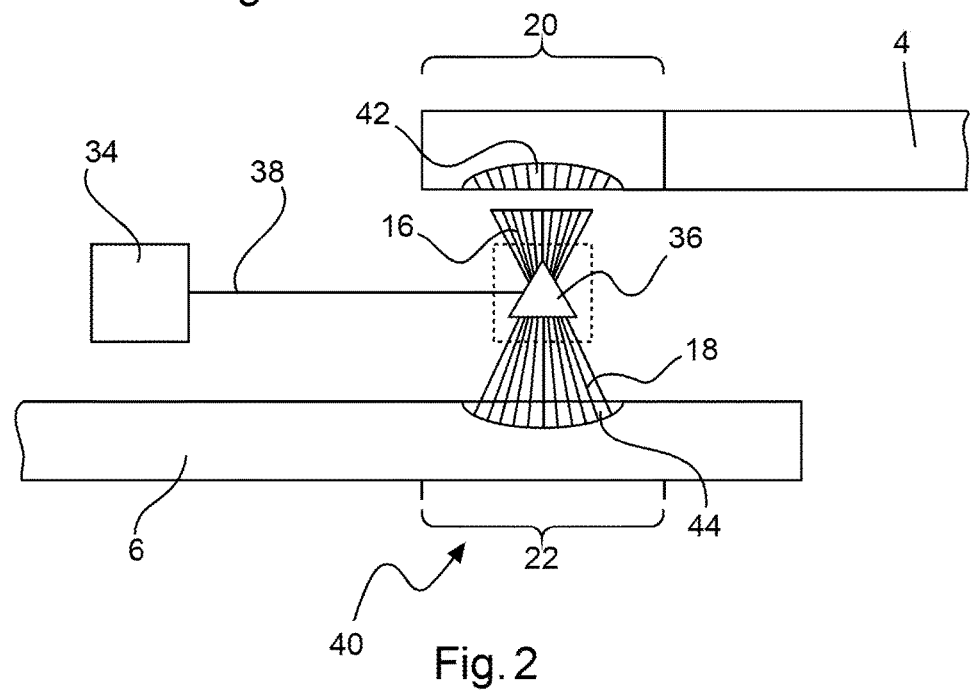
FIG. 2 shows a detail view onto the gap with a laser splitter.

FIG. 2 shows another, simplified view onto a joining region 40. Here, the border regions 20 and 22 in an overlapping arrangement are shown while being heated up. For this, the laser beam 38 is directed onto the prism arrangement 36, thus leading to the first laser beam 16 and the second laser beam 18 being transmitted to the border regions 20 and 22. As indicated, a first part 42 of the material on the first border region 20 is molten, while a second part 44 of the material on the second border region 22 is molten. For example, the material may be a thermoplastic material, such as PA, PPS, PEI, PEEK, PEKK or other, which may be reinforced by fibers.

Figure 3:
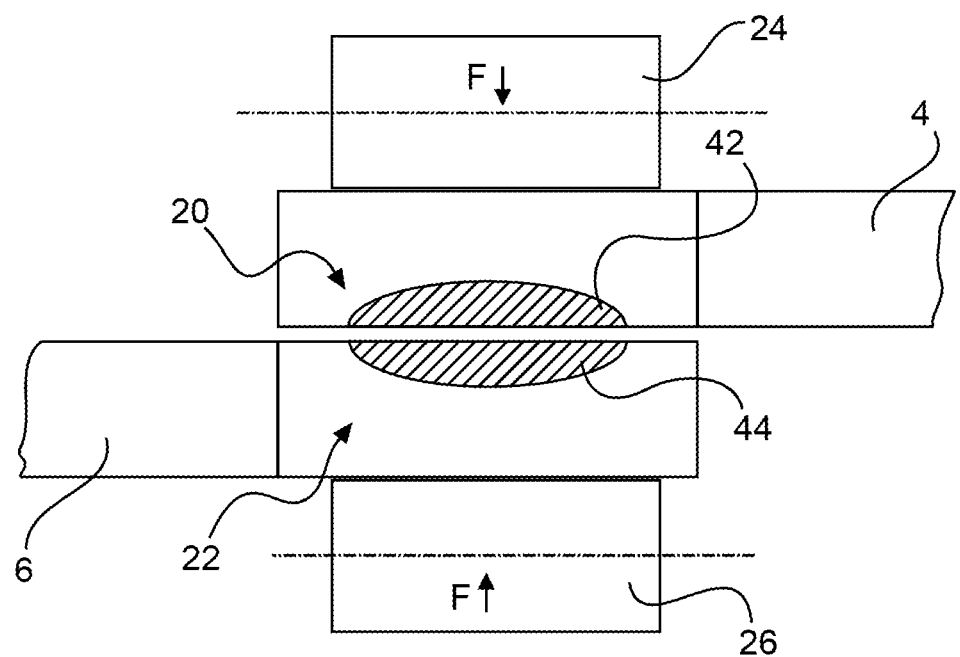
FIG. 3 shows the process of pressing the components onto each other.

Subsequently after being heated up, the molten parts 42 and 44 are pressed together, as schematically shown in FIG. 3. This is conducted by the pressure rollers 24 and 26, which exert a certain pressing force onto the border regions 20 and 22. Resultantly, the molten parts 42 and 44 form a material joint.

Figure 4:
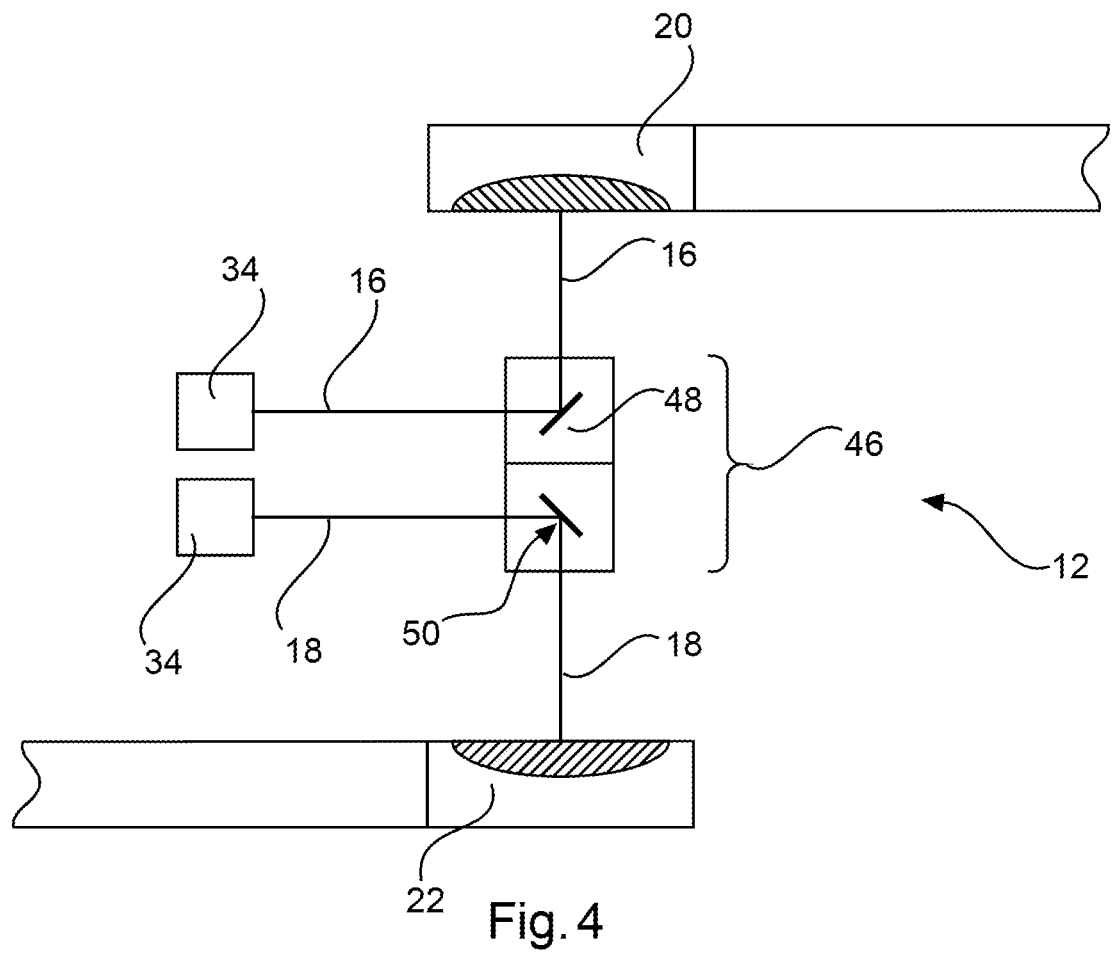
FIG. 4 shows a laser reflector in a schematic view inside the gap.

FIG. 4 shows a schematic view of an exemplary embodiment with a deflecting device 46, which comprises a first mirror 48 and a second mirror 50. Two individual lasers 34 are arranged outside of the deflecting device 46 and emit a first laser beam 16 and a second laser beam 18 on one of the mirrors 48 and 50. Consequently, the laser beams 16 and 18 are deflected to reach the first border region 20 and the second border region 22. Both mirrors 48 and 50 may be swiveled to let the first and second laser beams 16 and 18 sweep over a certain width of the border regions 20 and 22, as explained above. As an alternative to swiveling, the mirrors may also comprise a curved shape, which leads to spreading the laser beams 16 and 18 without swiveling.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a," "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for joining a first component and a second component of a meltable material, the system comprising:
    at least one energy source,
    a pair of separating guides, and
    a pair of pressure rollers,
    wherein the system is configured to place the second component relative to the first component on opposed sides of the separating guides so as to form an overlap between a first border region of the first component and a second border region of the second component under a gap between the first border region and the second border region, for heating the first border region and the second border region through the at least one energy source placed in the gap at least partially, for relatively moving the at least one energy source along the first border region and the second border region in the gap, and for pressing already heated sections of the first border region and the second border region onto each other by the pressure rollers, and
    wherein a first separating guide of the pair of separating guides engages an inner surface of the first component within the gap without engaging the second component and a second separating guide of the pair of separating guides engages an inner surface of the second component within the gap without engaging the first component.

2. The system according to claim 1,
    wherein the at least one energy source comprises a single laser and a laser splitter, and
    wherein the laser splitter is configured to separate a main laser beam emitted by the laser into a first laser beam and a second laser beam for heating the first border region and the second border region.

3. The system according to claim 2, wherein the laser splitter comprises a prism arrangement.

4. The system according to claim 2, wherein the laser splitter comprises a partially reflecting mirror.

5. The system according to claim 2, wherein the laser splitter comprises a wedge shaped mirror, which comprises two wedge surfaces at an angle to each other and wherein the main laser beam is directed onto a common edge of the mirror.

6. The system according to claim 1, wherein the pair of pressure rollers comprises a first pressure roller positioned to the first component opposite, and a second pressure roller opposite the first pressure roller forming a constriction therebetween, the second roller positioned to engage the second component.

7. The system according to claim 6, wherein the inner surface of the first component is directly bonded to the inner surface of the second component within the first and second border regions, and wherein the first pressure roller engages an outer surface of the first component and the second pressure roller engages an outer surface of the second component.

8. The system according to claim 1,
    wherein the at least one energy source comprises a first laser for emitting a first laser beam, a second laser for emitting a second laser beam and at least one deflecting device, which is arranged in the gap, and
    wherein the at least one deflecting device is configured to direct the first laser beam onto the first border region and the second laser beam onto the second border region.

9. A system for joining an inner surface a first component and an inner surface of a second component of a meltable material in face-to-face relationship, the system comprising:
    at least one energy source,
    a pair of separating guides, and
    a first pressure roller positioned to engage an outer surface of the first component opposite the inner surface of the first component,
    a second pressure roller opposite the first pressure roller forming a constriction therebetween, the second roller positioned to engage an outer surface of the second component opposite the inner surface of the second component, and
    wherein the system is configured to place the second component relative to the first component on opposed sides of the separating guides so as to form an overlap between a first border region of the first component and a second border region of the second component under a gap between the first border region and the second border region, for heating the first border region and the second border region through the at least one energy source placed in the gap at least partially, for relatively moving the at least one energy source along the first border region and the second border region in the gap, and for pressing already heated sections of the first border region and the second border region onto each other by the pressure rollers,
    wherein the inner surface of the first component is directly bonded to the inner surface of the second component within the first and second border regions,
    wherein a first separating guide of the pair of separating guides engages an inner surface of the first component within the gap without engaging the second component and a second separating guide of the pair of separating guides engages an inner surface of the second component within the gap without engaging the first component.

* * * * *